US012493565B2

(12) United States Patent
Valine

(10) Patent No.: US 12,493,565 B2
(45) Date of Patent: Dec. 9, 2025

(54) INTRODUCTION OF POISON TABLE IN DYNAMIC RANDOM ACCESS MEMORY IN A MEMORY SYSTEM

(71) Applicant: SK Hynix NAND Product Solutions Corp., Rancho Cordova, CA (US)

(72) Inventor: Craig Valine, Windsor, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/395,284

(22) Filed: Dec. 22, 2023

(65) Prior Publication Data

US 2025/0209011 A1    Jun. 26, 2025

(51) Int. Cl.
*G06F 12/00* (2006.01)
*G06F 12/0873* (2016.01)
*G06F 12/14* (2006.01)

(52) U.S. Cl.
CPC ...... *G06F 12/1491* (2013.01); *G06F 12/0873* (2013.01)

(58) Field of Classification Search
CPC ..... G06F 3/0659; G06F 3/0604; G06F 3/0679
See application file for complete search history.

(56) References Cited

U.S. PATENT DOCUMENTS

| 2009/0259806 | A1* | 10/2009 | Kilzer | G06F 12/0246 711/E12.008 |
| 2015/0293822 | A1* | 10/2015 | Chun | G11C 29/08 714/6.13 |
| 2017/0372799 | A1* | 12/2017 | Bacchus | G11C 29/42 |
| 2018/0067799 | A1* | 3/2018 | Genshaft | G06F 11/1068 |
| 2018/0225176 | A1* | 8/2018 | Kim | G06F 11/1448 |
| 2020/0151055 | A1* | 5/2020 | Eom | G06F 13/28 |
| 2020/0285550 | A1* | 9/2020 | Vrabel | G06F 11/1064 |
| 2022/0197815 | A1* | 6/2022 | Cariello | G06F 12/1009 |
| 2022/0358016 | A1* | 11/2022 | Park | G06F 11/1415 |

* cited by examiner

Primary Examiner — Arvind Talukdar
(74) Attorney, Agent, or Firm — Morgan, Lewis & Bockius LLP

(57) ABSTRACT

This application is directed to managing errors on a memory device. The memory device includes non-volatile memory (NVM) storing data and dynamic random-access memory (DRAM) storing a logic-to-physical (L2P) table and a poison table. The memory device obtains a data access request to access a data item stored in the NVM, and the data access request includes a logical address of the data item. The memory device identifies, in the L2P table, a mapping entry corresponding to the logical address of the data item, and the mapping entry maps the logical address of the data item to a physical address of the data item within the NVM, and determines that the mapping entry has an uncorrectable error. In accordance with a determination that the mapping entry has the uncorrectable error, the memory device adds, in the poison table, an index identifying the mapping entry in the L2P table.

20 Claims, 7 Drawing Sheets

At a memory device including non-volatile memory (NVM) storing data and dynamic random-access memory (DRAM) storing a logic-to-physical (L2P) table and a poison table: 602

Obtain a data access request to access a data item stored in the NVM, the data access request including a logical address of the data item. 604

Identify, in the L2P table, a mapping entry corresponding to the logic address of the data item. 606

The mapping entry maps the logical address of the data item to a physical address of the data item within the NVM. 608

Determine that the mapping entry has an uncorrectable error. 610

In accordance with a determination that the mapping entry has the uncorrectable error, add, in the poison table, an index identifying the mapping entry in the L2P table. 612

In accordance with a determination that the mapping entry 312 has the uncorrectable error, mark the mapping entry 312 in the L2P table 234 stored in the DRAM as invalid. 614

Write new address mapping information into the mapping entry in the L2P table. 616

Mark one or more bits in the mapping entry to indicate that the mapping entry is valid. 618

Clear, from the poison table, the index identifying the mapping entry. 620

Figure 6

INTRODUCTION OF POISON TABLE IN DYNAMIC RANDOM ACCESS MEMORY IN A MEMORY SYSTEM

TECHNICAL FIELD

This application relates generally to memory management including, but not limited to, methods, systems, and non-transitory computer-readable storage media for managing data faults or errors existing in data stored in a memory system (e.g., solid-state drives (SSDs)).

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). SSD faults and errors often lead to SSD asserts and result in a partial or complete loss of user data. An example is uncorrectable dynamic random-access memory (DRAM) errors. When an SSD experiences an uncorrectable DRAM error, an SSD assert is enabled, and an asserted drive could cause a significant or complete loss of user data, which requires an SSD customer to spend hours rebuilding the SSD from a redundant backup or face the loss of critical user data if no redundant copy exists. It would be beneficial to develop a solution that manage data faults or errors efficiently in a memory system (particularly, in a DRAM of a secondary memory).

SUMMARY

Various embodiments of this application are directed to methods, systems, devices, non-transitory computer-readable storage media for managing data faults or errors existing in data stored in a DRAM of a memory system (e.g., one or more SSDs). The DRAM stores a logic-to-physical (L2P) mapping table and a poison table, which is newly introduced to manage data faults or errors in the L2P table efficiently. The L2P mapping table that includes a plurality of mapping entries translating a plurality of logical addresses associated with an executable program to a plurality of physical addresses in the memory system. Some implementations of this application are directed to applying the poison table to control data errors in the L2P table that is located in the DRAM of the memory system. If a host consumes data, the memory device system coupled to the host remains available excepted the poisoned data marked in the poison table, and the host is given an option to overwrite or trim the poisoned data. Based on the poison table, the memory system enhances its reliability, serviceability, availability, and ARF by avoiding silent data corruption and drive assertion caused by unconsumed uncorrectable errors.

In one aspect, a method is implemented for managing data faults or errors existing in data stored in a DRAM of a memory device. The memory device includes non-volatile memory (NVM) storing data and dynamic random-access memory (DRAM) storing a logic-to-physical (L2P) table and a poison table. The method includes obtaining a data access request to access a data item stored in the NVM. The data access request includes a logical address of the data item. The method further includes identifying, in the L2P table, a mapping entry corresponding to the logical address of the data item. The mapping entry maps the logical address of the data item to a physical address of the data item within the NVM. The method further includes determining that the mapping entry has an uncorrectable error, and in accordance with a determination that the mapping entry has the uncorrectable error, adding, in a poison table, an index identifying the mapping entry in the L2P table.

In some embodiments, the method further includes in accordance with a determination that the mapping entry has the uncorrectable error, marking the mapping entry in the L2P table stored in the DRAM as invalid. In some embodiments, the method further includes reporting the uncorrectable error of the mapping entry via a poison indication message to a host device coupled to the memory device.

Some implementations of this application include an electronic device or a memory system. The electronic device or the memory system includes a controller, a memory device coupled to the controller and including local control circuitry, and memory having instructions stored thereon, which when executed by the memory device cause the memory device to perform any of the above methods.

Some implementations of this application include a memory device that includes control circuitry and memory having instructions stored thereon, which when executed by the control circuitry cause the control circuitry to perform any of the above methods.

Some implementations include a non-transitory computer readable storage medium storing one or more programs. The one or more programs include instructions, which when executed by a memory device cause the memory device to implement any of the above methods.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 6 is a flow diagram of an example method for managing errors in a memory system, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices using secondary storage.

Various embodiments of this application are directed to methods, systems, devices, non-transitory computer-readable storage media for managing data faults or errors existing in data stored in a DRAM of a memory system (e.g., one or more SSDs). The DRAM stores a logic-to-physical (L2P) mapping table and a poison table. The L2P mapping table that includes a plurality of mapping entries translating a plurality of logical addresses associated with an executable program to a plurality of physical addresses in the memory system. Some implementations of this application are directed to applying the poison table to control data errors in the L2P table located in the DRAM of the memory system, thereby enhancing memory performance on data loss and recovery time. Data recovery events are implemented to correct the data errors based on error locations in the DRAM using the poison table. Such data recovery events last for a few milliseconds, which are significantly shortened compared with a few hours otherwise taken by an SSD assert mode or state in which assert recovery and drive rebuilding are performed.

Some implementations of this application address issues associated with uncorrectable errors (e.g., DRAM errors associated with the L2P table) by marking host data associated with the errors as poisoned through introduction of the poison table. If a host consumes data, data stored in the memory system remains available to the host with the exception of the poisoned data as marked in the poison table. The host is given an option to overwrite or trim the poisoned data. Based on the poison table, the memory system avoids silent data corruption and drive assertion caused by unconsumed uncorrectable errors, and improves efficiency in handling of consumed DRAM errors. By these means, the poison table helps improve reliability, serviceability, availability, and an annualized failure rate (AFR) of the memory system (e.g., one or more SSDs), thereby increasing drive availability for non-poisoned data.

Figure 1:
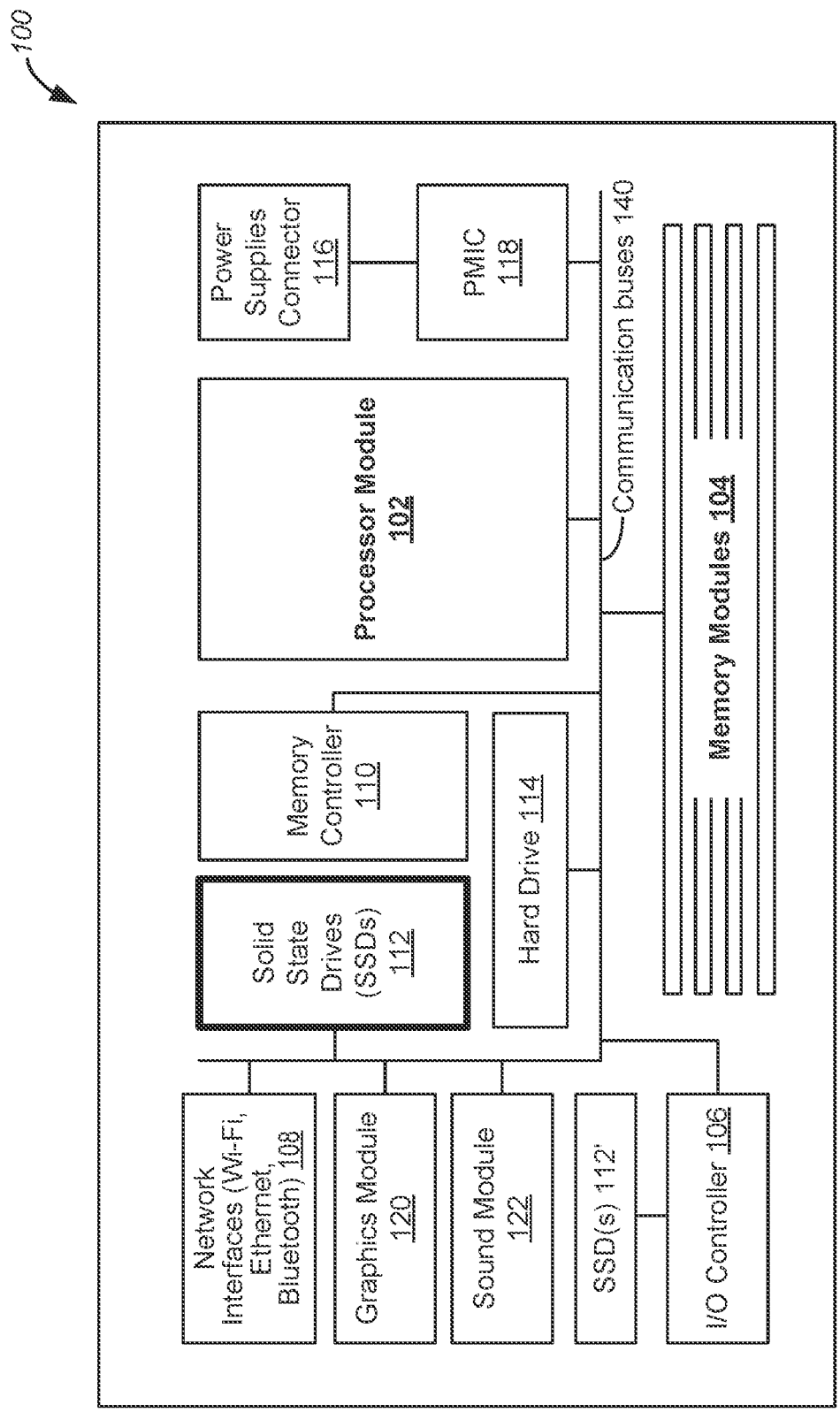
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
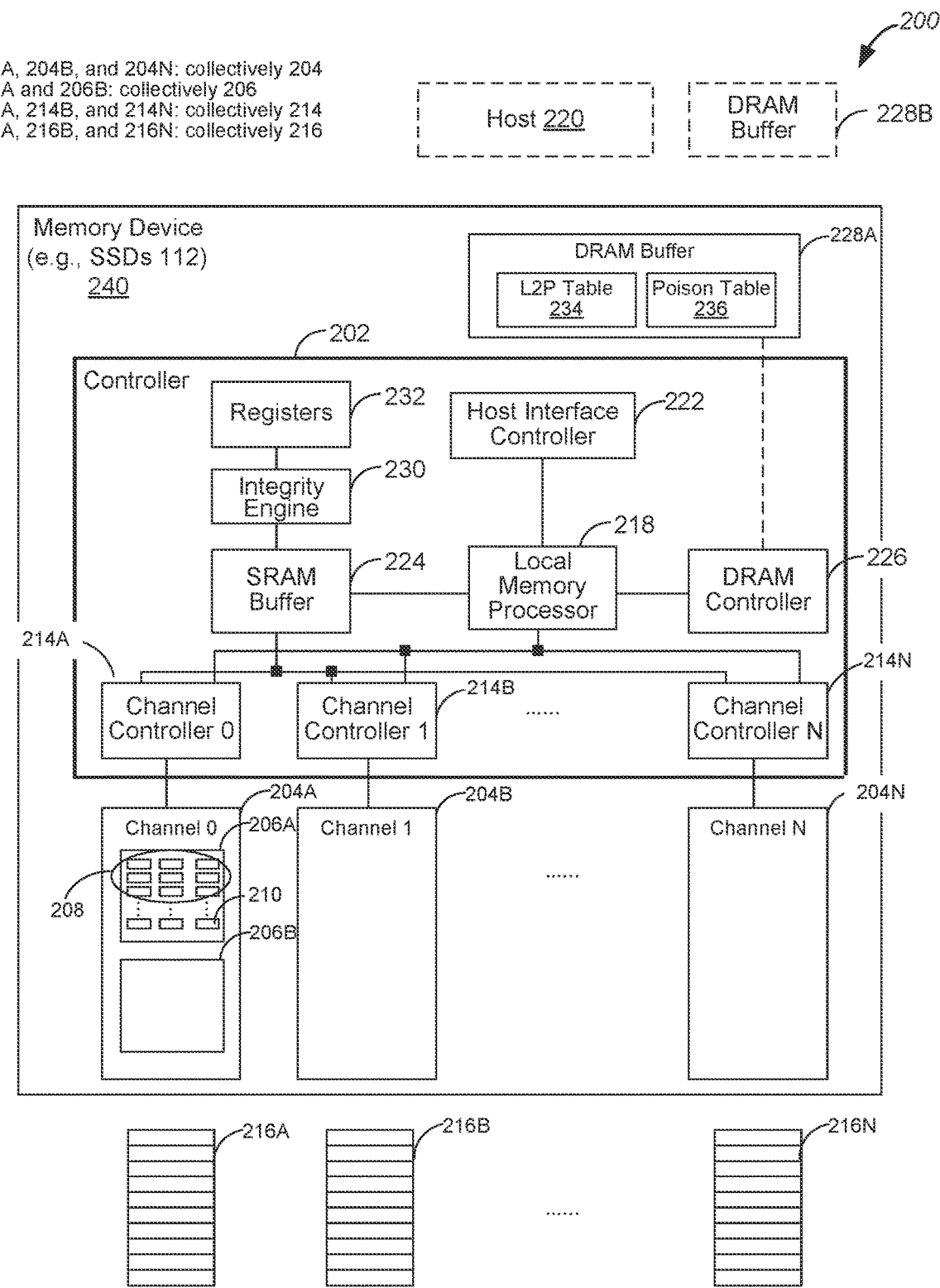
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

Figure 3:
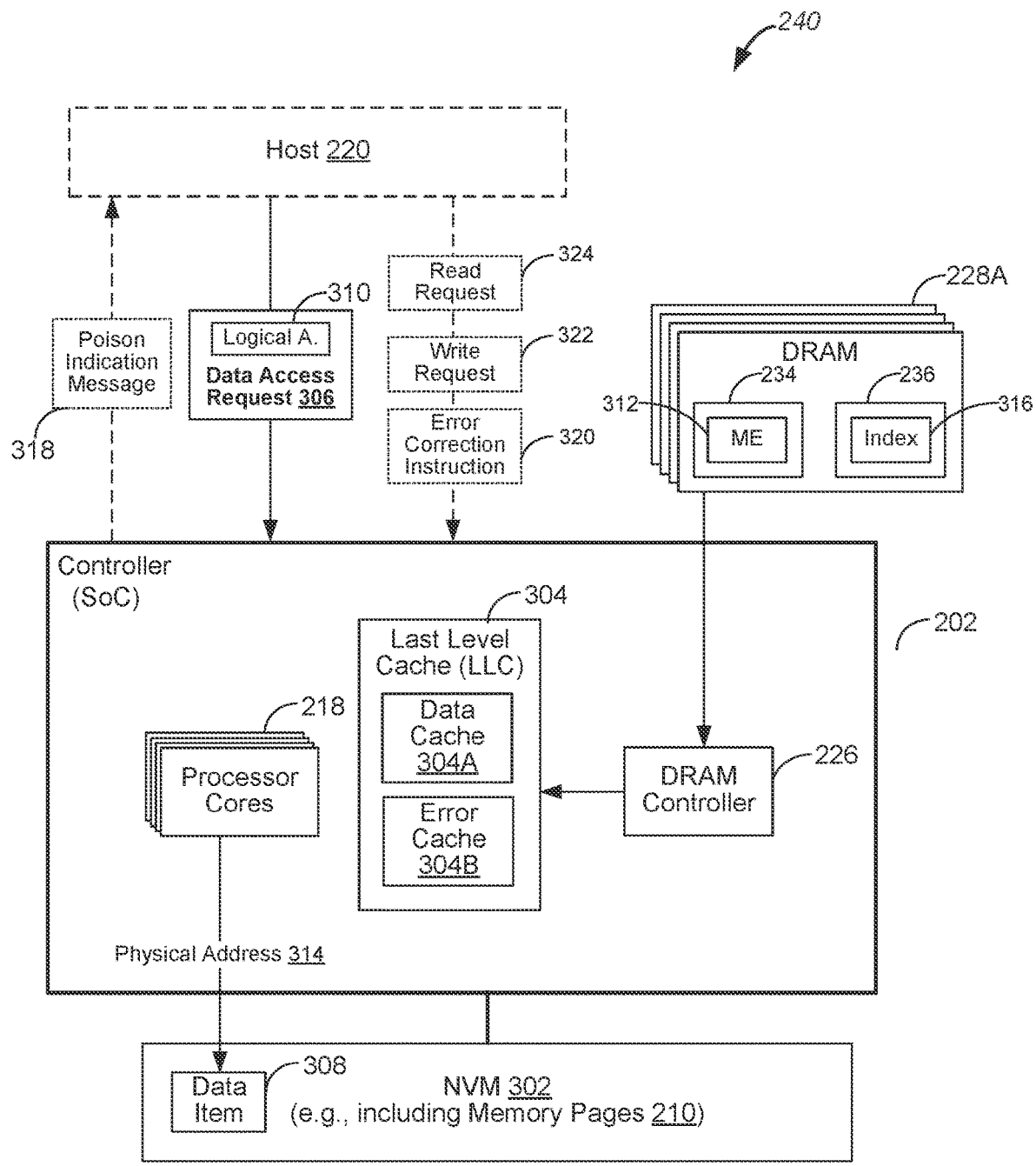
FIG. 3 is a block diagram of an example memory device including a poison table in a DRAM of a memory controller, in accordance with some embodiments.

In some embodiments, data in the plurality of memory channels 204 is grouped into coding blocks, and each coding block is called a codeword (e.g., 302 in FIG. 3). For example, each codeword includes n bits among which k bits correspond to user data and (n-k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some implementations of this application, the memory device 240 includes both NVM (e.g., memory channels 204) storing data and DRAM 228A storing a logic-to-physical (L2P) table 234 and a poison table 236. The memory device 240 obtains a data access request from a host 220 to access a data item stored in memory pages 210 of the memory channels 204, and the data access request includes a logical address of the data item. The L2P table 234 includes a mapping entry corresponding to the logical address of the data item, and the mapping entry maps the logical address of the data item to a physical address of the data item within the memory pages 210 of the memory channels 204. The memory device 240 determines that the mapping entry has an uncorrectable error. In accordance with a determination that the mapping entry has the uncorrectable error, the memory device 240 adds, in a poison table 236, an index identifying the mapping entry in the L2P table 234. In other words, the poison table 236 is stored in the DRAM 228A of the memory device 240, and applied to track one or more mapping entries of the L2P table 234 that have uncorrectable errors. Information stored in the poison table 236 is further used to facilitate memory operations in an adaptive manner, thereby holding the memory device 240 from entering an assert mode or state that interrupts normal operations of the memory device 240 and can last for an extended duration of time (e.g., hours in some situations).

FIG. 3 is a block diagram of an example memory device 240 including a poison table 236 in a DRAM 228A of a memory controller 202, in accordance with some embodiments. The memory device 240 is coupled to a host 220 (e.g., a processor module 102 of a memory module 100), and includes the controller 202, a non-volatile memory (NVM) 302, and the DRAM 228A. The NVM 302 includes a plurality memory channels 204 each of which further includes a plurality of memory pages 210, and keeps data stored the NVM 302 if the memory device 240 is decoupled from a power source. The controller 202 further includes one or more processor cores 218 running firmware programs for the memory device 240, a last level cache 304 temporarily storing instructions and data used by the one or more processor cores 218, and a DRAM controller 226 controlling the DRAM 228A to provide the instruction, data, or associated information used by the one or more processor cores 218. In some embodiments, the DRAM 228A has a separate substrate, and the controller 202 includes a system-on-chip (SoC) that is mechanically and electrically coupled to the DRAM 228A.

The DRAM 228A coupled to the controller 202 of the memory device 240 stores an L2P table 234 and a poison table 236. The memory device 240 receives a data access request 306 to access a data item 308 stored on the NVM 302 (e.g., on a memory page 210 of the NVM 302). The data access request 306 includes a logical address 310 where the memory page 210 storing the data item 308 appears to reside from a perspective of a program executed by the host 220 or controller 202. Examples of the data access request 306 include a read request, a write request, and a data validation request for an associated memory operation on the data item 308 that needs to be extracted from the NVM 302 based on the logical address 310. Based on the logical address 310, the controller 202 identifies, in the L2P table 234, a mapping entry 312 corresponding to the logical address 310 of the data item 308. The mapping entry 312 maps the logical address 310 of the data item 308 to a physical address 314 of the data item 306 within the NVM 302. The controller 202 determines that the mapping entry 312 has an uncorrectable error. In accordance with a determination that the mapping entry 312 has the uncorrectable error, the controller 202 adds, in the poison table 236, an index 316 identifying the mapping entry 312 in the L2P table 234.

In some embodiments, in accordance with a determination that the mapping entry 312 has the uncorrectable error, the memory device 240 marks the mapping entry 312 in the L2P table stored in the DRAM as invalid. The mapping entry 312 includes a plurality of bits (e.g., 32 bits), and a subset of the plurality of bits are applied to indicate whether the mapping entry 312 is poisoned. For example, the last bit of the 32 bits of the mapping entry 312 is used to indicate a validity state of the mapping entry 312, and equal to one of two distinct values, e.g., "0" (e.g., indicating that the mapping entry 312 is valid) and "1" (e.g., indicating that the mapping entry 312 is invalid). In some embodiments, in accordance with a determination that the mapping entry 312 has the uncorrectable error, the memory device 240 aborts both asserting the uncorrectable error and rebuilding the mapping entry 312. Instead, the mapping entry 312 having the uncorrectable error is tracked by the poison table 236, and the mapping entry 312 is optionally marked, thereby allowing the memory device to adaptively manage the uncorrectable error based on subsequent memory operations.

In some embodiments, in response to the data access request 306, the controller 202 loads data stored in the mapping entry 312 of the L2P table 234 into a data cache 304A (e.g., included in the last level cache 304). After determining that the mapping entry 312 has the uncorrectable error, the controller 202 logs, in an error cache 304B (e.g., included in the last level cache 304), information of the uncorrectable error including an error address in the L2P table 234 and an error type. The data stored in the mapping entry 312 is evicted from the data cache 304A without data writeback. The index 316 is added into the poison table 236 based on the information of the uncorrectable error logged in the error cache 304B.

In some embodiments, upon detection the uncorrectable error in the mapping entry 312, the controller 202 reports the uncorrectable error of the mapping entry 312 via a poison indication message 318 to the host 220 coupled to the memory device 340. Further, in some embodiments, in response to the poison indication message 318, the host 220 issues an error correction instruction 320, and the controller receives the error correction instruction 320, rewrites the data item 308 in the NVM 302, and updates the L2P table 234 with a renewed mapping entry for the rewritten data item 308. More details on error correction are explained below with reference to FIG. 4.

In some embodiments, a portion of the DRAM 228A corresponds to an L2P table 234 that maps logical addresses to physical addresses of memory pages 210. The portion is greater than a L2P size threshold (e.g., 80%). A size of the DRAM 228A increases with a size of the memory device 240 (e.g. measured by a number of memory pages 210). In an example, a size of the portion of the DRAM 228A (e.g., having 1 GB) corresponding to the L2P table 234 is three orders of magnitude above a size of a remainder of the DRAM 228A (e.g., having 1 MB) used to store firmware codes and data.

In some embodiments, the mapping entry 312 that has the uncorrectable error is applied to identify the physical address 314 of the data item 308, which is not consumed by the host 220. A firmware program is implemented to log information of the mapping entry 312 that has the uncorrectable error in the poison table 236. The memory device 240 does not start an assert operation on the uncorrectable error immediately. The memory device 240 optionally overwrites the mapping entry 312, while at least signifying that the mapping entry 312 is lost or corrupted. This state is defined as "poisoned." As explained above, in accordance with a determination that the mapping entry 312 has the uncorrectable error, the memory device 240 adds, in the poison table 236, the index 316 identifying the mapping entry 312 in the L2P table 234. In some embodiments, the memory device 240 also marks the mapping entry 312 itself as invalid in the L2P table 234 stored in the DRAM 228A.

In an example, 64-bit data chunks stored in the DRAM 228A are protected in with 8-bit error correction codes (e.g., formed using a single-error correcting and double-error detecting (SECDED) method). Each mapping entry 312 has 32 bits, and represents a 4 KB memory page 210. Each 64-bit data chunk includes two mapping entries that identify two 4 KB memory pages 210 (i.e., storing 8 KB data in total).

In some embodiments, the data item 308 associated with the mapping entry 312 is unconsumed, and the mapping entry 312 is marked as poisoned and invalid. A write operation (e.g., associated with a write request 322) is implemented on the mapping entry 312 stored in the DRAM 228A to overwrite the uncorrectable error, thereby eliminating a possibility of an uncorrectable error in the DRAM 228A being converted to silent data corruption after additional bit flips. A more efficient mechanism is to mark the mapping entry 312 as invalid and maintain an index 316 identifying the mapping entry 312 in the poison table 236. In some embodiments, in response to a read request 324, the memory device 240 determines that the mapping entry 312 is invalid based on one or more bits of the mapping entry 312 that mark itself as invalid, and checks the poison table in accordance with a determination that the mapping entry 312 is invalid. The memory device 240 further detects the index 316 identifying the mapping entry 312 in the poison table 236, and determines that the mapping entry 312 has the uncorrectable error. Additionally, in some embodiments, in accordance with the index 316 identified in the poison table 236, the memory device 240 applies the write or trim operation to the mapping entry 312 to clear the uncorrectable error optionally in response to the write request 322. The write operation overwrites the mapping entry 312 having the uncorrectable error in the L2P table with a next mapping entry 312, and clears the index 316 identifying the mapping entry 312 having the uncorrectable error from the poison table 236.

Figure 4:
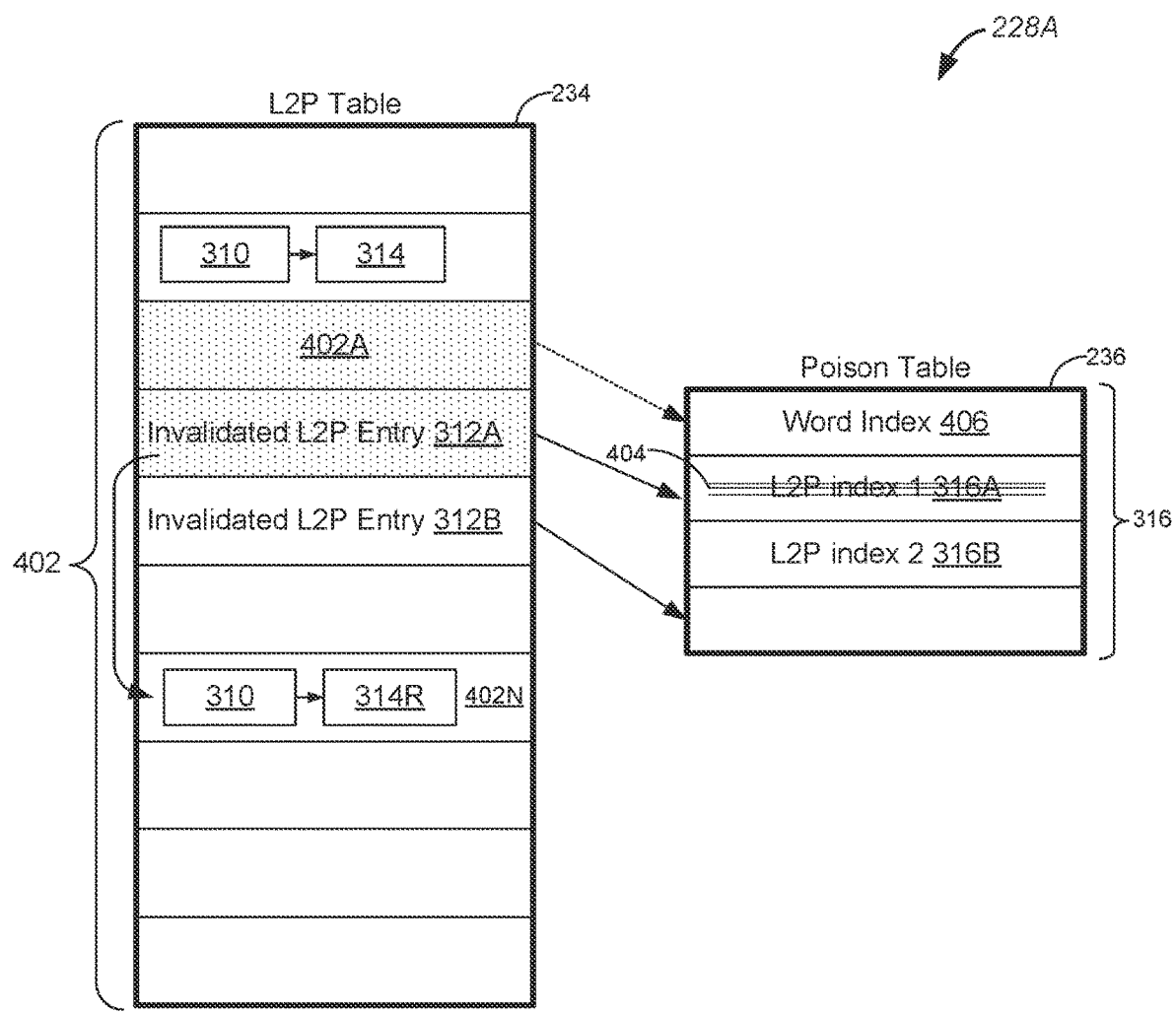
FIG. 4 is a diagram illustrating a data structure of an example DRAM storing a poison table, in accordance with some embodiments.

FIG. 4 is a diagram illustrating a data structure of an example DRAM 228A storing a poison table 236, in accordance with some embodiments. The DRAM 228A includes an L2P table 234 in addition to the poison table 236. The poison table 236 is added into the DRAM 228A to track mapping entries of the L2P table 234 that have uncorrectable errors. In some embodiments, the L2P table 234 stores a plurality of mapping entries 402 translating a plurality of logical addresses 310 to a plurality of physical addresses 314. For each mapping entry 402, a respective logical address 310 includes an address a memory page 210 storing a respective data item 308 appears to reside from a perspective of a program executed by a host 220 or controller 202, and a respective physical address 314 indicates where the respective data item 308 is physically stored in the NVM 302 of the memory device 240. In an example, a physical address 314 is larger than a data byte length (e.g., has 16 bits), and the corresponding mapping entry 402 includes at least two data bytes. Additionally, the DRAM 228A stores the poison table 236, which includes one or more indexes 316 and identifies a subset of the plurality of mapping entries 402 (e.g., the mapping entry 312 in FIG. 3) having uncorrectable errors. For example, the subset of the plurality of mapping entries 402 includes a first mapping entry 312A and a second mapping entry 312B, which are identified by a first index 316A and a second index 316B, respectively. Each of the mapping entries 312A and 312B has at least one error bit.

In some embodiments, after a mapping entry 312 (e.g., 312A) having an uncorrectable error is identified and tracked in the poison table 236, the controller 202 of the memory device 240 receives an error correction instruction 320. The controller 202 of the memory device 240 rewrites the data item 308 in the NVM 302, and updates the L2P table 234 with a renewed mapping entry 402N for the rewritten data item 308. Specifically, in some embodiments, a copy of the data item 308 is rewritten and stored in a new physical address 314R of the NVM 302. The new physical address 314R is optionally identical to, or distinct from, the physical address 314 of the mapping entry 312 having the uncorrectable error. A new mapping entry 402N is generated for the logical address 310 of the mapping entry 312 to map the logical address 310 to the new physical address 314R of the rewritten copy of the data item 308. The new mapping entry 402N is stored in the L2P table 234. The controller 202 clears (operation 404) the index 316 (e.g., 316A) associated with the mapping entry 312 (e.g., 312A) corresponding to the logical address 310 of the data item 308 in the poison table 236. In some embodiments, this error correction instruction 320 is implemented after the data access request 306 which has resulted in detection of the mapping entry 312 having the uncorrectable error. In some embodiments, this error correction instruction 320 is implemented after a data read request 324.

In some embodiments, the memory device 240 receives from the host 220 a data access request 306 to access a data item 308 stored in the NVM 302, and the data item 308 is consumed by the host 220 and could result in a data abort operation (e.g., an assert operation) immediately or with a delay. Under some circumstances, the assert operation causes a loss of user data stored in the memory device 240 entirely or in part. In various embodiments of this application, a firmware program includes a data abort handler configured to enable the data abort operation that marks the mapping entry 312 having the uncorrectable error as poisoned (i.e., invalid).

In some embodiments, the data access request 306 includes a write request. The mapping entry 312 is read in the L2P table 234, but will not be used in accordance with a determination that the mapping entry 312 is marked as poisoned in the poison table 236. In some embodiments, referring to FIG. 4, the write request of a memory page 210 (e.g., having a size of 4 KB) includes a logical address 310 that corresponds to one mapping entry 312A. An uncorrectable error is detected, e.g. impacting two entries 312A and 402A. A word entry 402A is associated with an unwritten physical address. One of the two entries (i.e., the mapping entry 312A) has an uncorrectable error, and is marked as poisoned in the poison table 236. The other one of the two entries (i.e., the word entry 402) A has an uncorrectable error and is not used for address mapping, and therefore, the word entry 402A is not tracked in the poison table 236. In some embodiments, the uncorrectable error is reported to the host 220 immediately in response to the write request.

Conversely, in some embodiments, the uncorrectable error is not reported to the host 220 immediately in response to the data access request 306 (e.g., which includes a write request). Execution of the firmware program continues. The mapping entry 312 having the uncorrectable error is marked as poisoned in the L2P table 234, the poison table 236, or both. Specifically, the mapping entry is marked in the L2P table 234, and the poison table 236 is added with an index identifying the mapping entry. Additionally, in some embodiments, a subsequent write operation (e.g. associated with the write request 322 in FIG. 3) overwrites the mapping entry that is marked before another data access request is received from the host 220 to use the corresponding data item 308. There is no need to report that the mapping entry 312 in the L2P table 234 is poisoned. Stated another way, before the invalid mapping entry 312 and associated data item 308 are used by the host 220, the L2P table 234 has been updated in response to the subsequent write request 322 to clear the uncorrectable error of the mapping entry 312 in the L2P table 24.

Figure 5A:
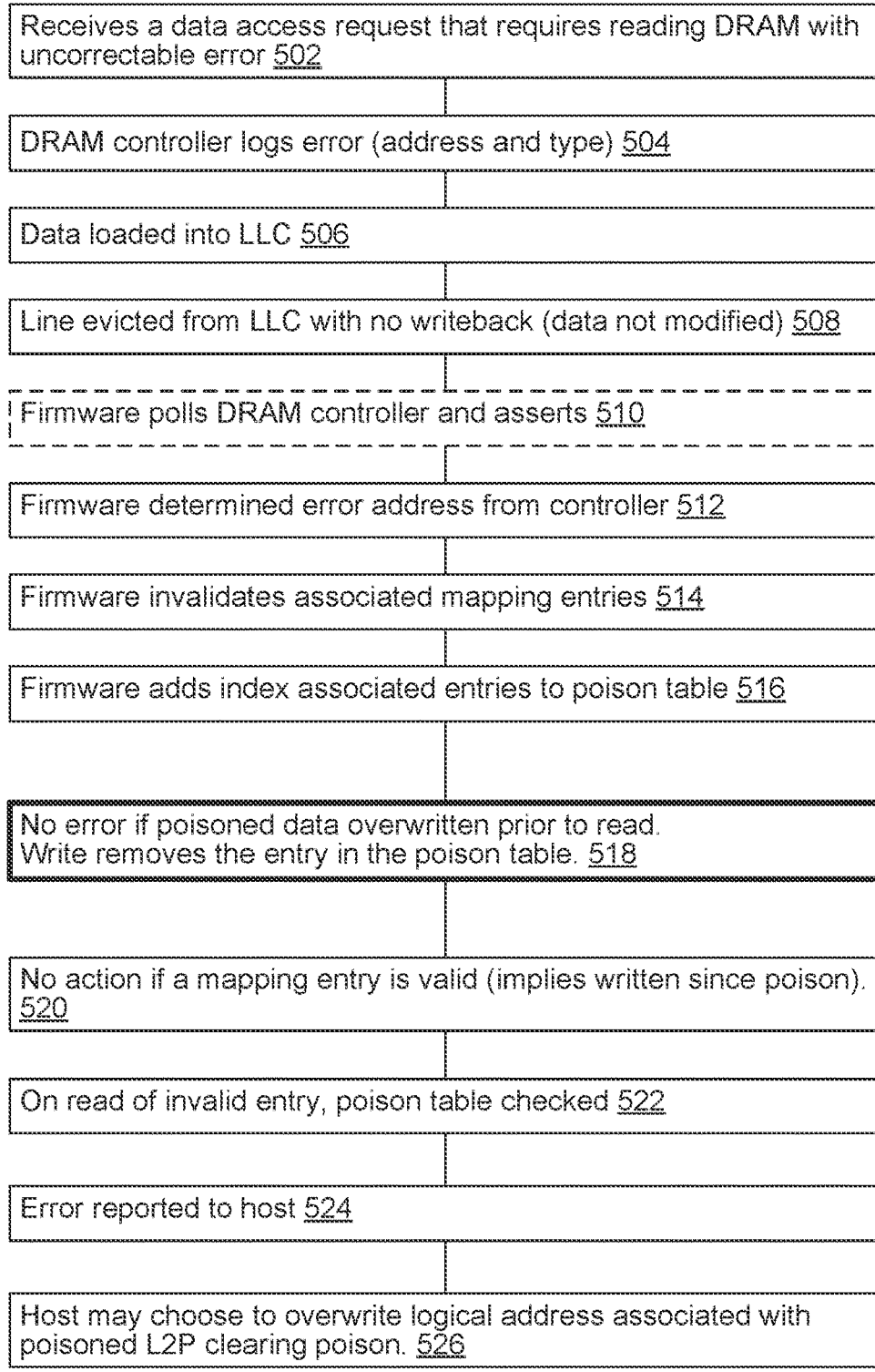
FIG. 5A is a flow diagram of an example process of accessing unconsumed data addressed via a mapping entry of an L2P table having an uncorrectable error, in accordance with some embodiments.

FIG. 5A is a flow diagram of an example process 500 of accessing unconsumed data addressed via a mapping entry of an L2P table 234 having an uncorrectable error, in accordance with some embodiments. A data access request 306 received from the host 220 includes (operation 502) a data read request 324 to read a data item 308 that is associated with a logical address 310 and stored in the memory device 240. The L2P table 234 stores a mapping entry 312 corresponding to the logical address 310 of the requested data item 308, and the mapping entry 312 maps the logical address 310 of the data item 308 to a physical address 314 of the data item 308 within the memory device 240. A controller 202 of the memory device 240 determines that the mapping entry 312 has an uncorrectable error. Under some circumstances, the data item 308 is not consumed by the host 220. The uncorrectable error of the mapping entry 312 does not need to be cleared immediately upon detection of the error, as far as it can be corrected before a next memory request associated with the data item 308 is implemented.

In some embodiments, in response to the data access request 306, after determining that the mapping entry 312 has the uncorrectable error, the controller 202 of the memory device 240 logs (operation 504) information of the uncorrectable error including an error address in the L2P table 234 and an error type. The controller 202 loads (operation 506) data (e.g., those stored in the mapping entry 312 of the L2P table 234, the information of the uncorrectable error) into a last level cache 304. Data stored in the mapping entry 312 are evicted (operation 508) from the cache 304 without data writeback. A firmware program avoids (operation 510) implementation of an assert operation. Instead, in some embodiments, the firmware program determines (operation 512) the error address, and invalidates (operation 514) the mapping entry 312 in the L2P table 234. An index 316 is added (operation 516) into the poison table 236 based on the information of the uncorrectable error logged in the error cache 304B.

In some embodiments, prior to the read request 324, the data item 306 corresponding to the mapping entry 312 having the uncorrectable error has been rewritten (operation 518), and the mapping entry 312 is cleared from the poison table 236. In other words, a mapping entry 402 included in the read request 324 does not have any uncorrectable error, and is valid (operation 520).

Conversely, in some embodiments, prior to the read request 324, the data item 306 corresponding to the mapping entry 312 having the uncorrectable error has not been corrected. The controller 202 checks (operation 522) the poison table 236. In accordance with a determination that the mapping entry 312 has an uncorrectable error, the controller 202 of the memory device 240 sends (operation 524) a message 318 to the host 220 indicating that the mapping entry 312 corresponding to the logical address 310 of the requested data item 308 is poisoned (e.g., has an uncorrectable error). Further, in some embodiments, in response to receiving the message indicating the uncorrectable error, the host 220 sends (operation 526) a request 320 or an instruction 322 to write or trim the data item 308 to clear the uncorrectable error of the mapping entry 312.

Figure 5B:
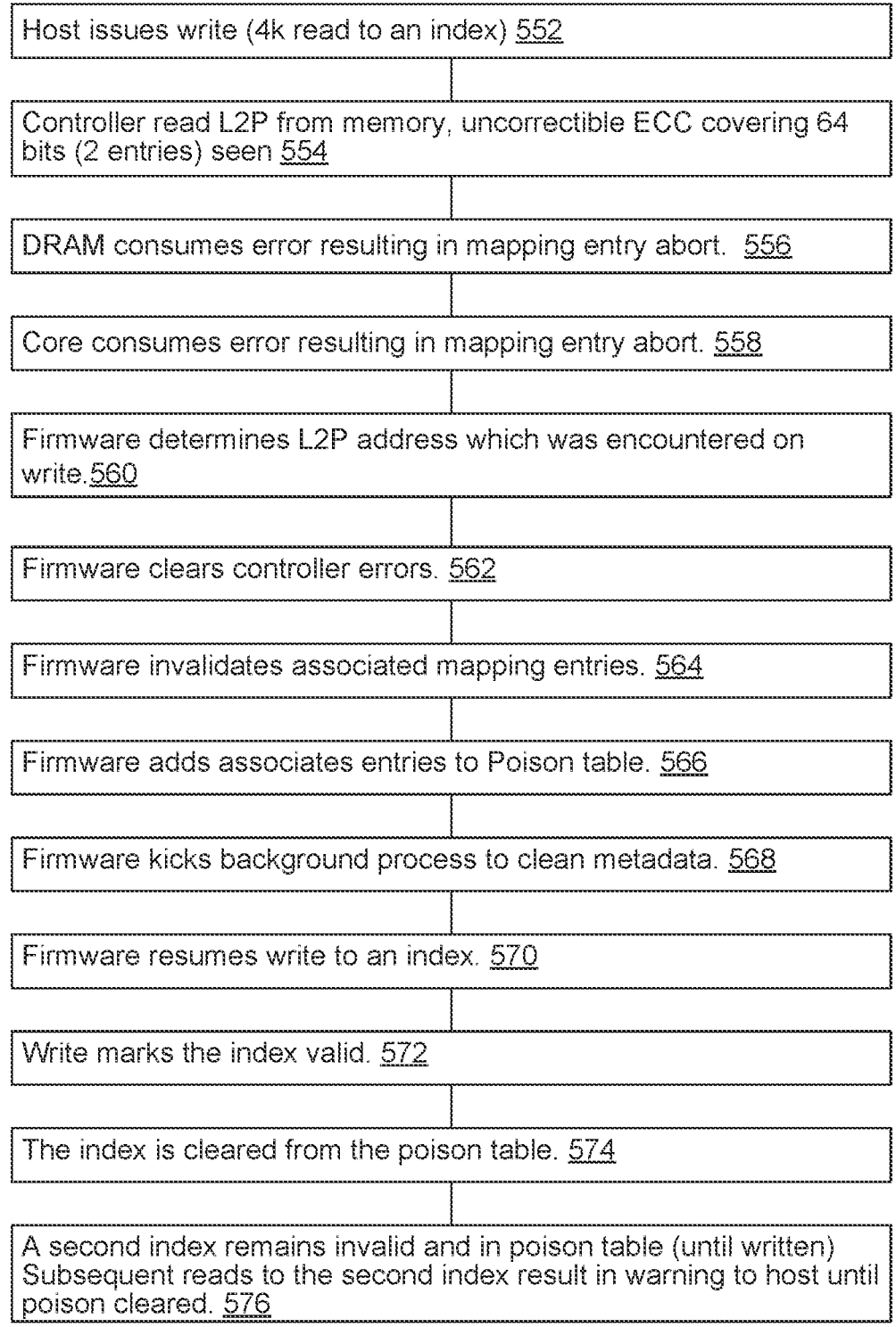
FIG. 5B is a flow diagram of an example process of writing a data item addressed via a mapping entry of an L2P table having an uncorrectable error, in accordance with some embodiments.

FIG. 5B is a flow diagram of an example process 550 of writing a data item 308 addressed via a mapping entry 312 of an L2P table 234 having an uncorrectable error, in accordance with some embodiments. The data item 308 is associated with a logical address 310 and stored in a physical address 314 of the memory device 240. The L2P table 234 stores the mapping entry 312 that maps the logical address 310 of the data item 308 to the physical address 314 of the data item 308 within the memory device 240. A controller 202 of the memory device 240 determines that the mapping entry 312 has an uncorrectable error, and adds an index 316 identifying the mapping entry 312 in the poison table 236 of the DRAM 228A. Under some circumstances, the data item 308 is rewritten to clear the uncorrectable error of the mapping entry 312 before the controller 202 of the memory device 240 receives a request to access and use the data item 308. For example, the data item 308 is rewritten and the index 316 is cleared in the poison table 236 immediately after detection and marking of the error.

In some embodiments, a data access request 306 received from the host 220 includes (operation 552) a data write request 322 to write, or an error correction instruction 320 to correct, the data item 308 having a logical address 310 (e.g., corresponding to a memory page 210 having a size of 4 KB). The L2P table 234 stores a mapping entry 312 corresponding to the logical address 310 of the data item 308, and the mapping entry 312 maps the logical address 310 of the data item 308 to a physical address 314 where the data item will be stored within the memory device 240. In some situations, the controller 202 obtains (operation 554) one or more mapping entries 402 (e.g., including the mapping entry 312) and associated error correction code (ECC). In an example, every two mapping entries 402 (e.g., having 64 bits in total) share the same ECC (e.g., having 8 bits). The controller 202 determines that the mapping entry 312 has an uncorrectable error, thereby causing both the DRAM controller 226 and the processor core(s) 218 of the controller 202 to abort (operations 556 and 558) using the mapping entry 312 having the uncorrectable error. A firmware program identifies (operation 560) the logical address 310 associated with the write request 322, and tracks the uncorrectable errors via the write request 322 for further error clearing operations (operation 562). In some embodiments, the controller 202 marks (operation 564) the mapping entry 312, e.g., by setting one or more bits of the mapping entry 312 to predefined values indicating a validity state of the mapping entry 312. An index 316 is added (operation 566) to the poison table 236, indicating that the mapping entry 312 associated with the logical address 310 has the uncorrectable error.

In some embodiments, in accordance with a determination that the mapping entry 312 has the uncorrectable error, the controller 202 of the memory device 240 implements (operation 568) a background process to clean metadata that is stored in the memory device 240 for the program and will be compromised with the loss of the mapping entry 312 having the uncorrectable error. For example, in some situations, the metadata includes a band of the memory channels 204 where a memory page 210 associated with the physical address 314 is located. This band of the memory channels 204 is cleaned, after the mapping entry 312 is marked as being poisoned (e.g., having the uncorrectable error).

In some embodiments, the mapping entry 312 is overwritten (operation 570) by new address mapping information having no uncorrectable error to generate a new mapping entry 402 at the same location of the L2P table 234, independently of whether the new mapping entry 402 includes the logical address 310 of the mapping entry 312 or not. The mapping entry 402 is marked (operation 572) as valid, e.g., by setting one or more bits of the mapping entry 402 to a first predefined value (e.g., "0") indicating a valid state of the mapping entry 402. The index 316 representing the mapping entry 312 is cleared (operation 574) from the poison table 236. Alternatively, in some embodiments, the data item 308 is rewritten at the new physical address 402N (FIG. 4) associated with a new mapping entry 402N (FIG. 4). The mapping entry 312 remains marked as invalid, e.g., by setting the one or more bits of the mapping entry 402 to a second predefined value (e.g., "1") indicating an invalid state of the mapping entry 312. The index 316 representing the mapping entry 312 is cleared (operation 574) from the poison table 236.

In an example, 64-bit data chunks stored in the DRAM 228A are protected in with 8-bit error correction codes (e.g., formed using a single-error correcting and double-error detecting (SECDED) method). Each mapping entry 402 has 32 bits, and represents a 4 KB memory page 210. A 64-bit data chunk includes two entries 312A and 402A (FIG. 4). The mapping entry 312A is used to map the logical address 310 to the physical address 314. The two entries 312 and 402A are determined to have the uncorrectable error jointly, and marked jointly as invalid (operation 576), e.g., by setting the one or more bits of each of the entries 312A and 402A to the second predefined value (e.g., "1"). In some embodiments, the word entry 402A is used for address mapping, and the word entry 402A is also tracked in the poison table 236 with a word index 406. A subsequent read request 324 for the mapping entry 402A results in (operation 576) an alert message sent to the host 220, and is implemented after the word index 406 is cleared from the poison table 236. Conversely, in some embodiments, the word entry 402A is not used for address mapping, and the word entry 402A is not tracked in the poison table 236 with the word index and can be used directly to store new address mapping information.

In accordance with a determination that the poison table 236 includes the index 316 identifying the mapping entry 312, the controller 202 determines that the mapping entry is invalid, and rewrites a copy of the data in a new physical address of the memory device 240 (e.g., identifying a new memory page 210). The controller 202 generates a new mapping entry for the logical address to map the logical address to the new physical address of the rewritten copy of the data, and stores the new mapping entry in the L2P table 234. The index associated with the mapping entry corresponding to the logical address of the data is cleared in the poison table 234. In some embodiments, the new physical address is identical to the physical address identified by the mapping entry that has the uncorrectable error, and an L2P check is implemented on the physical address prior to writing the data into the physical address. Alternatively, in some embodiments, the new physical address is identical to the physical address identified by the mapping entry that has the uncorrectable error.

FIG. 6 is a flow diagram of an example method for managing errors in a memory system 200, in accordance with some embodiments. The memory system 200 includes a memory device 240 coupled to a host 220 and having a memory controller 202 (FIG. 2). The method 600 is implemented by the memory device 240. In an example, the memory device 240 includes an SSD that further includes the memory controller 202 and is configured to implement the method 600. The memory device 240 (e.g., a controller 202 of the memory device 240 in FIG. 2). The memory device 240 includes (operation 602) non-volatile memory (NVM 302) 302 storing data and dynamic random-access memory (DRAM) 228A storing a logic-to-physical (L2P) table 234 and a poison table 236. The memory device 240 obtains (operation 604) a data access request 306 to access a data item 308 stored in the NVM 302, the data access request 306 including a logical address 310 of the data item 308. The memory device 240 identifies (operation 606), in the L2P table 234, a mapping entry 312 corresponding to the logical address of the data item 308. The mapping entry 312 maps (operation 608) the logical address 310 of the data item 308 to a physical address 314 of the data item 308 within the NVM 302. The memory device 240 determines (operation 610) that the mapping entry 312 has an uncorrectable error, and in accordance with a determination that the mapping entry 312 has the uncorrectable error, adds (operation 612), in the poison table 236, an index 316 identifying the mapping entry 312 in the L2P table 234.

In some embodiments, in accordance with a determination that the mapping entry 312 has the uncorrectable error, the memory device 240 marking (614) the mapping entry 312 in the L2P table 234 stored in the DRAM as invalid. Further, in some embodiments, the memory device 240 receives a data read request including the logical address 310 of the data item 308. In response to the data read request, the memory device 240 extracts, from the L2P table 234, the mapping entry 312 corresponding to the logical address 310 of the data item 308. In accordance with a determination that the mapping entry 312 is invalid, the memory device 240 checks the poison table 236 and identifying the index 316 in the poison table 236. In accordance with the index 316 identified in the poison table 236, the memory device 240 determines that the mapping entry 312 has the uncorrectable error.

In some embodiments, the memory device 240 reports the uncorrectable error of the mapping entry 312 via a poison indication message to a host device coupled to the memory device 240. Further, in some embodiments, in response to the poison indication message, the memory device 240 receives an error correction instruction by the memory device 240. In response to the error correction instruction, the memory device 240 rewrites a copy of the data item 308 stored in a new physical address 314 of the NVM 302, and generates a new mapping entry 312 for the logical address 310 to map the logical address 310 to the new physical address 314 of the rewritten copy of the data item 308. The memory device 240 stores the new mapping entry 312 in the L2P table 234 and clears the index 316 associated with the mapping entry 312 corresponding to the logical address 310 of the data item 308 in the poison table 236.

In some embodiments, in response to the data access request 306, the memory device 240 loads data stored in the mapping entry 312 of the L2P table 234 into a data cache. After determining that the mapping entry 312 has the uncorrectable error, the memory device 240 logs, in an error cache, information of the uncorrectable error including an error address in the L2P table 234 and an error type. The memory device 240 evicts the data stored in the mapping entry 312 from the data cache without data writeback. The index 316 is added into the poison table 236 based on the information of the uncorrectable error logged in the error cache.

In some embodiments, the memory device 240 implements a program by accessing the data item 308 in response to the data access request 306, and in accordance with a determination that the mapping entry 312 has the uncorrectable error, implements a background process to clean metadata stored in the memory device 240 for the program.

In some embodiments, in accordance with a determination that the mapping entry 312 is invalid, the memory device 240 overwrites the mapping entry 312 in the L2P table 234, marks the mapping entry 312 as valid, and clears, from the poison table 236, the index 316 identifying the mapping entry 312 in the L2P table 234.

In some embodiments, the mapping entry 312 includes a first mapping entry 312A, and the index 316 includes a first index 316A identifying the first mapping entry 312. The memory device 240 determines that the mapping entry 312 has the uncorrectable error in accordance with a determination that a combination of the first mapping entry 312 and one or more word entries 402A (e.g., one word entry) has the uncorrectable error.

Further, in some embodiments, the memory device 240 marks each of the one or more word entries 402A in the L2P table 234 as invalid using a subset of the respective word entry (e.g., a last bit). In some embodiments, the memory device 240 adds, in the poison table 236, one or more word indexes 406, and each word index 406 identifying a respective one of the one or more word entries in 402A the L2P table 234. In some embodiments, for each of the one or more word entries 402A, in accordance with a determination that the respective word entry 402A is used for address mapping, the memory device 240 adds in the poison table 236 a word index 406 identifying a respective one of the one or more word entries 402A in the L2P table 234. In accordance with a determination that the respective word entry 402A is not used for address mapping, the memory device 240 aborts adding in the poison table 236 the word index 406. In some embodiments, each of the first mapping entry 312 and one or more word entries has 32 bits, and the combination of the first mapping entry 312 and one or more word entries 402A has 64 bits and is validated jointly.

In some embodiments, the memory device 240 writes (operation 616) new address mapping information into the mapping entry 312 in the L2P table 234, marks (operation 618) one or more bits (e.g., last one bit) in the mapping entry 312 to indicate that the mapping entry 312 is valid, and clears (operation 620), from the poison table 236, the index 316 identifying the mapping entry 312.

In some embodiments, the physical address 314 is larger than a data byte length, and the mapping entry 312 includes at least 2 data bytes.

In some embodiments, the L2P table 234 includes a plurality of mapping entries 312 translating a plurality of logical addresses 310 to a plurality of physical addresses 314, and the poison table 236 identifies a subset of the plurality of mapping entries 402 having uncorrectable errors.

In some embodiments, in accordance with a determination that the mapping entry 312 has the uncorrectable error, the memory device 240 aborts asserting the uncorrectable error and rebuilds the mapping entry 312.

In some embodiments, the controller has a DRAM controller 226, one or more processing cores 218, and a cache 304, and forms a system-on-chip (SoC).

In some embodiments, in accordance with detection of an uncorrectable error in the DRAM 228A, the controller 202 of the memory device 240 enables an immediate drive assert operation. In an example, the drive assert operation include assert recovery and SSDs rebuilds and takes more than 10 hours. Conversely, in some embodiments, in accordance with detection of an uncorrectable error in the DRAM 228A, the controller 202 of the memory device 240 does not enable any drive assert operation, and adds an index into the poison table 236, identifying the mapping entry associated with the uncorrectable error in the L2P table. Further, in some situations, in accordance with a determination that data including the uncorrectable error is actually consumed by a shot, the data is selectively rewritten. The rewritten data has a size of several Kbytes of data, and the rewrite operation requires 1-1000 milliseconds and causes no or little data loss. As such, application of the poison table 236 significantly enhances reliability and serviceability of the memory device 240 (e.g., SSDs).

Memory is also used to store instructions and data associated with the method 600, and includes high-speed random-access memory, such as SRAM, DDR DRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600. Alternatively, in some embodiments, the electronic system implements the method 600 at least partially based on an ASIC. The memory system 200 of the electronic system includes an SSD in a data center or a client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at a memory device, comprising:
    at a memory device including non-volatile memory (NVM) storing data and dynamic random-access memory (DRAM) storing a logic-to-physical (L2P) table and a poison table:
        obtaining a data access request to access a data item stored in the NVM, the data access request including a logical address of the data item;
        identifying, in the L2P table, a mapping entry corresponding to the logical address of the data item, wherein the mapping entry maps the logical address of the data item to a physical address of the data item within the NVM;
        determining that the mapping entry has an uncorrectable error;
        in accordance with a determination that the mapping entry has the uncorrectable error, adding, in the poison table, an index identifying the mapping entry in the L2P table and marking the mapping entry in the L2P table stored in the DRAM as invalid;
        receiving a data read request including the logical address of the data item; and
        in response to the data read request:
            extracting, from the L2P table, the mapping entry corresponding to the logical address of the data item;
            in accordance with a determination that the mapping entry is invalid, checking the poison table and identifying the index in the poison table; and
            in accordance with the index identified in the poison table, determining that the mapping entry has the uncorrectable error.

2. The method of claim 1, further comprising:
    reporting the uncorrectable error of the mapping entry via a poison indication message to a host device coupled to the memory device.

3. The method of claim 2, further comprising:
    in response to the poison indication message, receiving an error correction instruction by the memory device; and
    in response to the error correction instruction:
        rewriting a copy of the data item stored in a new physical address of the NVM;
        generating a new mapping entry for the logical address to map the logical address to the new physical address of the rewritten copy of the data item;
        storing the new mapping entry in the L2P table; and
        clearing the index associated with the mapping entry corresponding to the logical address of the data item in the poison table.

4. The method of claim 1, the method further comprising, in response to the data access request:
    loading data stored in the mapping entry of the L2P table into a data cache;
    after determining that the mapping entry has the uncorrectable error, logging, in an error cache, information of the uncorrectable error including an error address in the L2P table and an error type; and
    evicting the data stored in the mapping entry from the data cache without data writeback;

wherein the index is added into the poison table based on the information of the uncorrectable error logged in the error cache.

5. The method of claim 1, further comprising:
implementing a program, including accessing the data item in response to the data access request; and
in accordance with a determination that the mapping entry has the uncorrectable error, implementing a background process to clean metadata stored in the memory device for the program.

6. The method of claim 1, further comprising:
in accordance with a determination that the mapping entry is invalid, overwriting the mapping entry in the L2P table;
marking the mapping entry as valid; and
clearing, from the poison table, the index identifying the mapping entry in the L2P table.

7. The method of claim 1, wherein the physical address is larger than a data byte length, and the mapping entry includes at least 2 data bytes.

8. The method of claim 1, wherein the L2P table includes a plurality of mapping entries translating a plurality of logical addresses to a plurality of physical addresses, and the poison table identifies a subset of the plurality of mapping entries having uncorrectable errors.

9. A memory device, comprising non-volatile memory (NVM) storing data;
dynamic random-access memory (DRAM) storing a logic-to-physical (L2P) table and a poison table; and
a controller coupled to the NVM and DRAM, the controller is configured to execute one or more programs including instructions for:
obtaining a data access request to access a data item stored in the NVM, the data access request including a logical address of the data item;
identifying, in the L2P table, a mapping entry corresponding to the logical address of the data item, wherein the logical address of the data item is configured to be translated to a physical address of the data item stored in the NVM according to the mapping entry;
determining that the mapping entry has an uncorrectable error;
in accordance with a determination that the mapping entry has the uncorrectable error, adding, in the poison table, an index identifying the mapping entry in the L2P table and marking the mapping entry in the L2P table stored in the DRAM as invalid;
receiving a data read request including the logical address of the data item; and
in response to the data read request:
extracting, from the L2P table, the mapping entry corresponding to the logical address of the data item;
in accordance with a determination that the mapping entry is invalid, checking the poison table and identifying the index in the poison table; and
in accordance with the index identified in the poison table, determining that the mapping entry has the uncorrectable error.

10. The memory device of claim 9, wherein:
the mapping entry includes a first mapping entry, and the index includes a first index identifying the first mapping entry; and
determining that the mapping entry has the uncorrectable error further includes determining that a combination of the first mapping entry and one or more word entries has the uncorrectable error.

11. The memory device of claim 10, the one or more programs further comprising instructions for:
marking each of the one or more word entries in the L2P table as invalid using a subset of the respective word entry.

12. The memory device of claim 10, the one or more programs further comprising instructions for:
adding, in the poison table, one or more word indexes, each word index identifying a respective one of the one or more word entries in the L2P table.

13. The memory device of claim 10, the one or more programs further comprising instructions for, for each of the one or more word entries:
in accordance with a determination that the respective word entry is used for address mapping, adding in the poison table a word index identifying a respective one of the one or more word entries in the L2P table; and
in accordance with a determination that the respective word entry is not used for address mapping, aborting adding in the poison table the word index.

14. The memory device of claim 10, wherein each mapping entry has 32 bits, and the combination of the first mapping entry and one or more word entries has 64 bits and is validated jointly.

15. The memory device of claim 9, wherein the controller further includes a DRAM controller, one or more processing cores, and a cache, and forms a system-on-chip (SoC).

16. A non-transitory computer-readable storage medium, storing one or more programs for execution by one or more processors, the one or more programs further comprising instructions for:
at a memory device including non-volatile memory (NVM) storing data and dynamic random-access memory (DRAM) storing a logic-to-physical (L2P) table and a poison table:
obtaining a data access request to access a data item stored in the NVM, the data access request including a logical address of the data item;
identifying, in the L2P table, a mapping entry corresponding to the logical address of the data item, wherein the logical address of the data item is configured to be translated to a physical address of the data item stored in the NVM according to the mapping entry;
determining that the mapping entry has an uncorrectable error;
in accordance with a determination that the mapping entry has the uncorrectable error, adding, in the poison table, an index identifying the mapping entry in the L2P table and marking the mapping entry in the L2P table stored in the DRAM as invalid;
receiving a data read request including the logical address of the data item; and
in response to the data read request:
extracting, from the L2P table, the mapping entry corresponding to the logical address of the data item;
in accordance with a determination that the mapping entry is invalid, checking the poison table and identifying the index in the poison table; and
in accordance with the index identified in the poison table, determining that the mapping entry has the uncorrectable error.

17. The non-transitory computer-readable storage medium of claim 16, further comprising instructions for:

writing new address mapping information into the mapping entry in the L2P table;

marking one or more bits in the mapping entry to indicate that the mapping entry is valid; and clearing, from the poison table, the index identifying the mapping entry.

18. The non-transitory computer-readable storage medium of claim 16, further comprising instructions for:

in accordance with a determination that the mapping entry has the uncorrectable error, aborting asserting the uncorrectable error and rebuilding the mapping entry.

19. The method of claim 1, wherein:

the mapping entry includes a first mapping entry, and the index includes a first index identifying the first mapping entry; and determining that the mapping entry has the uncorrectable error further includes determining that a combination of the first mapping entry and one or more word entries has the uncorrectable error; and the method further includes, in accordance with a determination that a first word entry is used for address mapping, adding in the poison table a word index identifying the first word entry in the L2P table.

20. The method of claim 1, wherein:

the mapping entry includes a first mapping entry, and the index includes a first index identifying the first mapping entry; and determining that the mapping entry has the uncorrectable error further includes determining that a combination of the first mapping entry and one or more word entries has the uncorrectable error; and the method further includes, in accordance with a determination that a first word entry is not used for address mapping, aborting adding in the poison table a word index identifying the first word entry.

* * * * *